Jan. 17, 1956    H. E. RITTENHOUSE    2,731,029
BOTTOM FILL APPARATUS

Filed May 4, 1951      2 Sheets-Sheet 2

HOWARD E. RITTENHOUSE
INVENTOR.

BY Edmund W. E. Kamm
ATTORNEY

United States Patent Office 2,731,029
Patented Jan. 17, 1956

2,731,029
BOTTOM FILL APPARATUS

Howard E. Rittenhouse, Fort Wayne, Ind., assignor of one-half to Bowser, Inc., Fort Wayne, Ind., a corporation of Indiana, and one-half to Tokheim Corporation, a corporation of Indiana Application May 4, 1951, Serial No. 224,529

20 Claims. (Cl. 137—235)

This invention relates to a bottom fill apparatus for tanks. More specifically, it relates to means for filling the compartments of a tank truck to a predetermined level from a point below the bottom of the tank.

This application is a continuation in part of my prior application, Serial No. 193,701, filed November 2, 1950, now Patent No. 2,678,658, granted May 18, 1954, for Tank Filling Apparatus, and my prior joint application with Sherwood Hinds, Serial No. 160,266, filed May 5, 1950, for Tank Filling Apparatus.

It is an object of the apparatus to fill the tank or the various compartments of a tank individually to a predetermined level for each tank.

A further object of the invention is to fill such tank or compartments accurately to said predetermined level.

Another object is to provide means for filling one compartment at a time.

Yet a further object of the invention is to provide means for filling a compartment to one level at a high rate of delivery and then to "top-off" the compartment accurately, but at a lesser rate.

Another object of the invention is to provide a positive but automatic shut-off mechanism for slowing and finally stopping the flow.

These and other objects will become apparent from a study of this specification and the drawings which are attached hereto and made a part hereof and in which.

Tank structure

Figure 1:
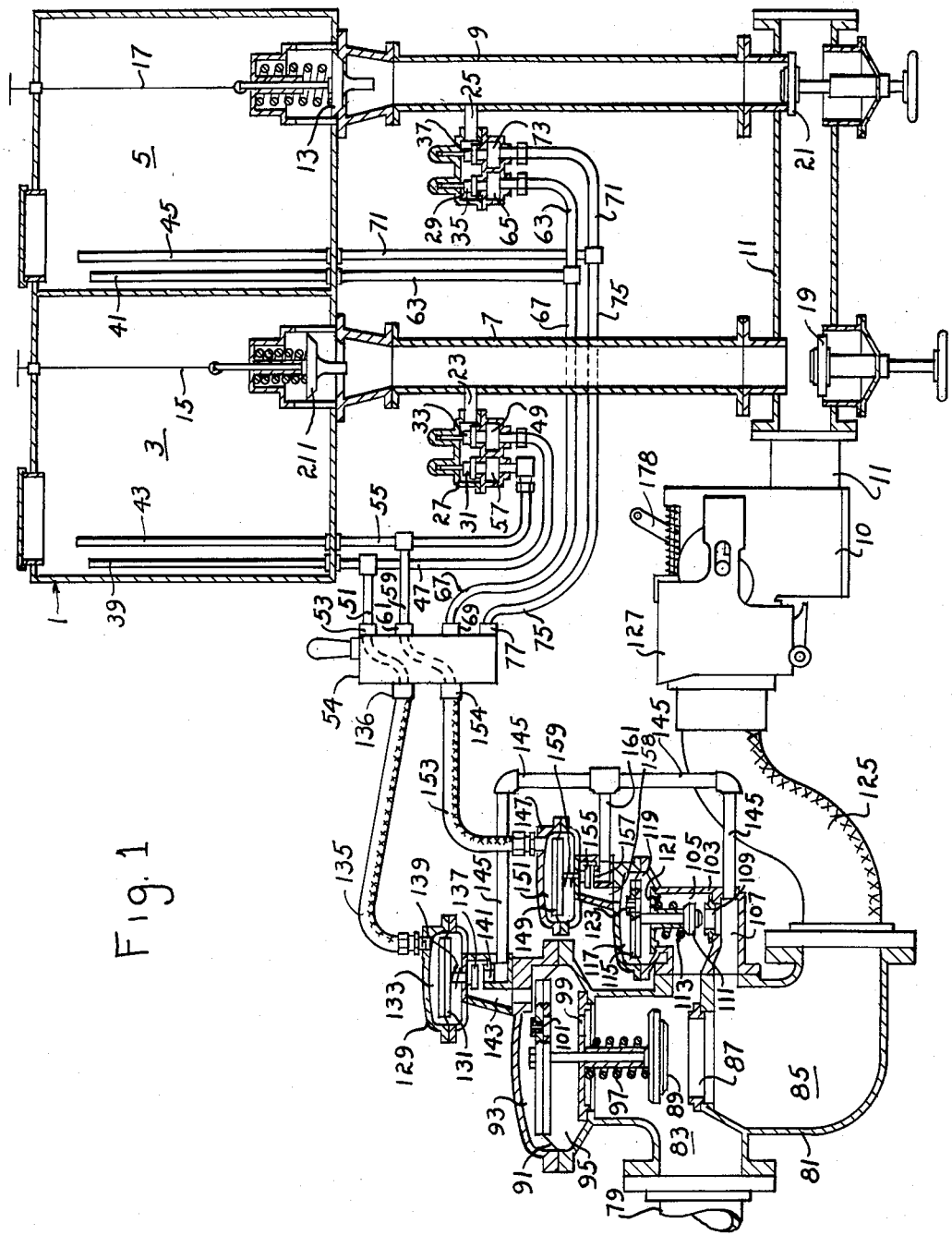
Figure 1 is a schematic view of the tank and the filling apparatus with parts shown in section.

Referring to the drawings, the numeral 1 indicates a truck tank having two compartments 3 and 5 respectively which are suitably vented, although in practice there may be only one or there may be multiple compartments.

The compartments are provided with combined fill and drain pipes 7, 9 which communicate with the manifold 11 and are hereinafter referred to as fill pipes.

The manifold has a housing 10 which is fitted with valves 12 and 14 which are operated by cam 16. The latter is operated by lever 178. Valve 14 serves to open a valve 18 in the end of fitting 20 on hose 125. Suitable springs are provided for closing the valves when the lever is in the disconnect position.

Spring closed check valves 211, 13 are mounted in the compartments. They serve to close the fill pipes to prevent draining of the compartments accidentally. The valves may be opened at will and held open for unloading the compartments by means of rods 15, 17 and a suitable actuating mechanism (not shown). They are of course, opened by liquid flowing into the compartments.

Manually operable valves 19, 21 in the manifold control the lower ends of the fill pipes to regulate the communication thereof with the manifold.

Lateral conduits 23, 25 extend from the fill pipes intermediate the valves and communicate respectively with the discharge chambers 27, 29 of the weight closed check or bleed valves 31, 33 and 35, 37 respectively. The valves open in a direction to permit flow of liquid toward the fill pipe.

Each compartment has a short tube 39, 41, hereinafter referred to as the "slow tube," which is open at the top and terminates at the predetermined level at which it is desired to reduce the rate of fluid flow into the tank. Each compartment is also provided with a tube 43, 45 which is open at the top and terminates at the level to be occupied by the liquid when the compartment is full. This is designated the "stop tube."

Slow tube 39 is connected by conduit 47 with the inlet chamber 49 of the check valve 33. The conduit 47 has a lateral branch 51 which terminates in a port 53 in selector valve 54.

Similarly, "stop tube" 43 is connected by conduit 55 with the inlet chamber 57 of check valve 31 and has a lateral branch 59 which terminates in a port 61 in selector valve 54.

The "slow tube" 41 is connected by conduit 63 to inlet chamber 65 of check valve 35 and by lateral branch 67 to port 69.

The "stop tube" 45 is connected by conduit 71 to inlet chamber 73 of check valve 37 and by lateral branch 75 to port 77.

Ground installation

The supply system from which the tank compartments are filled include a storage tank, pump, controls, etc., which are normally found in any liquid pumping system.

The supply line 79 of this system is connected to the valve body 81 which has inlet and outlet compartments 83, 85, a valve port 87 therebetween which is controlled by a poppet type valve 89. This apparatus is hereinafter referred to as the "main valve."

A diaphragm chamber is formed in the upper portion of the body 81 and a diaphragm 91 divides it into upper and lower chambers 93, 95. The diaphragm is connected to the stem of valve 89 and a spring 97 normally urges the valve closed.

Pressure is equalized in chambers 83 and 95 through port 99 which is relatively large and unrestricted. Pressure in chambers 95 and 93 tends to equalize through the restricted port 101 formed in the diaphragm, which is small and prevents the rapid transfer of liquid therethrough.

A second valve body 103 is attached to body 81 and has inlet and outlet chambers 105, 107 which communicate through a port 109, controlled by the poppet type valve 111 which is normally urged closed by spring 113 and is hereinafter called the "stop valve." The chambers 105 and 107 are in constant communication with the chambers 83 and 85 respectively of the main valve.

Valve 111 is connected for operation by a diaphragm 115 which forms chambers 117, 119 in the top portion of the valve. Chamber 119 has unrestricted communication with chamber 105 through the large port 121 while the restricted port 123 furnishes limited communication between chambers 117 and 119.

The hose 125 is connected to chamber 85 of the main valve and is detachably connected with the manifold 11 by any suitable quick coupling 127 which carries the valve operating lever 178.

Mounted on the top of the main valve is a casing 129 having a diaphragm 131 therein which defines an upper chamber 133 which is connected by hose 135 and a valved quick connector coupling 136 to the selector valve 54. The other side of the diaphragm is exposed to atmosphere.

A valve 137 is carried by the diaphragm and is normally urged by spring 139 to open the port 141 in the passage 143 leading from the diaphragm chamber 93 of the main valve to the discharge chamber 85 thereof by way of conduit 145 and chamber 107 of the valve body 103.

A similar casing 147 is mounted on the valve body 103 and has a diaphragm 149 forming a chamber 151 which is connected by hose 153 and the valved quick connector coupling 154 to selector valve 54. The other side of the diaphragm is open to atmosphere. The valves in couplings 136 and 154 are opened automatically as the connection is made.

The valve 155, carried by the diaphragm is normally urged by spring 159 to open the port 157 and to connect the passage 158 from chamber 117 of valve 103 to the conduit 145 by way of passage 161.

Operation

Assuming that the tank compartments are empty and that the supply line 79, valve bodies 81 and 103, hose 125 and coupler 127 are full of liquid under pressure. The valves 137 and 155 will be closed because there is liquid trapped under pressure in the hoses 135, 153 which serves to hold the diaphragms down and valves 137 and 155 closed. The pressures in the diaphragm chambers 93, 95 and 117, 119 will therefore be equalized so that springs 97 and 113 will hold valves 89 and 111 closed.

If we then desire to fill the compartment 3, the valve 19 will be opened, valve 21 closed and check valves 211 and 13 set so that they will be held closed by their springs.

Hoses 135 and 153 will be connected to the selector valve 54 at the proper points and the selector valve is set to the position to establish communication between the hoses and conduits 47 and 55 respectively. This relieves the pressure in chambers 133 and 151 so that valves 137 and 155 will be opened by the associated springs 139, 159. The hose 125 will be coupled to the manifold and the valves therein will be opened by means of lever 178. One of the valves 19 and 21 in the manifold, which determine the compartment to be filled, must also be opened. Both valves may be opened if both compartments are to be filled with the same product.

The opening of valves 12, 14 and 18 will relieve the pressure in hose 125, chambers 85, 107, pipes 145 and 161 and the diaphragm chambers 93 and 117. Since this release of pressure cannot be compensated through the orifices 101, 123, the pressure on the upper sides of the diaphragms is less than that on the lower sides so that they will overcome the respective springs 97, 113 and will open both valves 89 and 111.

Even though the pressure in chambers 85 and 107 now approaches the pressure in chambers 83 and 105, there is enough difference in the pressures due to the restriction afforded by the valves which, together with the fact that the pressures across the valve poppets is now balanced, enables the diaphragms to overcome the springs and the valves 89 and 111 are opened and held open.

The compartment 3 is therefore filled by liquid flowing from the delivery line which includes the flexible hose 125 and the coupling 127. From the coupling 127 liquid flows through the manifold 11, through fill pipe 7 and check valve 211 into the compartment. As the level in the tank reaches the top of the "slow" tube 39, liquid will flow into the tubes 39, 51, 47, hose 135 to chamber 133 and valve inlet chamber 49. The check valve 33 is held closed because the high pressure in pipe 7 is transmitted through pipe 23 to the valve chamber 27. Since this is greater than the static head in chamber 49 even when tube 39 is full, the check valve 33 cannot open.

The diaphragm 131 however, is depressed as the tube 39 is filled and closes valve 137 to isolate the diaphragm chamber 93. The pressures in chambers 93 and 95 are balanced through the orifice 101 so that the spring 97 now becomes effective to close valve 89. The diaphragm and orifice serve as a dash pot for the valve to prevent it from slamming shut.

Filling of the compartment continues through the valve 103 at a reduced rate because the valve port 109 is relatively small.

When the liquid overflows the tube 43, it will pass to the valve chamber 57 and diaphragm chamber 151 through conduits 55, 59 and hose 153 respectively.

Valve 31 cannot open because pump pressure is applied to the outlet chamber 27.

The filling of tube 43 applies hydrostatic pressure to the diaphragm 149 and closes valve 155 thus isolating chamber 117 of the valve 111. The pressure across the diaphragm 115 is balanced through the orifice 123 so that spring 113 will be effective to close the valve 111 and will stop the flow. Check valve 211 closes.

The operator will then close valve 19 and open valve 21. The valve lever 178 is also preferably moved to the valve closed position. Selector valve 54 is set to establish communication between hoses 135, 153 and the tubes 67 and 75 respectively. The lever 178 is then actuated to open the valve at the manifold so that the valves 89 and 111 will be opened in the manner described above in connection with compartment 3. While the hoses are full of liquid, the tubes 41 and 45 are empty so that there is not enough hydrostatic head on the diaphragms 131 and 149 to keep their associated valves closed.

The filling proceeds as before at the full rate until tube 41 is filled and thereafter at the topping off rate until tube 45 is filled which results in stopping the flow entirely as described above.

The valve 21 is then closed, lever 178 is operated to close the manifold inlet; the selector valve is preferably set at a neutral position which closes off all the tubes 39, 41, 43, 45 and the hoses 125, 135 and 153 are disconnected so that the truck, fully and accurately loaded is ready to travel and the ground installation is cleared for a subsequent operation.

When the driver reaches an unloading station he will attach a discharge hose (not shown) to the manifold, placing the nozzle thereof in the receptacle to be filled. He will open the valves 19 or 21, 211 or 13 and will operate the lever 178 to open the manifold valve. Liquid will then drain by gravity from the selected compartment and since the pressure in the fill pipe 7 or 9 is now at the most, merely the hydrostatic head of liquid in the compartment, the liquid in tubes 39 and 43 or 41 and 45 depending on the compartment being drained, will lift the valves 31, 33 or 35, 37 and will drain the tubes and their associated conduits at least to a level determined by the weight of the valves and any suction which may be induced in the tubes 23, 25 by the liquid flowing from the pipes 7 and 9. In any case the head of liquid trapped in conduits 47, 55, 67, 75 will be less than that required to overcome the springs 139, 159 so that valves 137 and 155 will be opened as soon as the selector valve is set for a subsequent filling of the respective compartments.

The filling operation will then proceed as described above.

Stop valve

Figure 2:
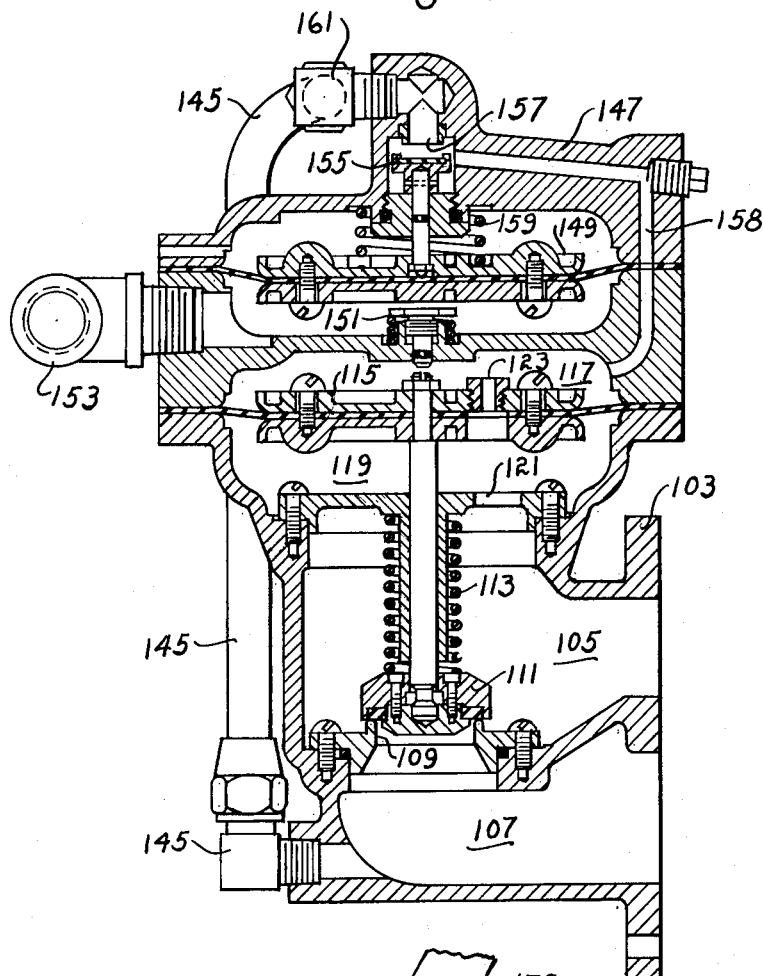
Figure 2 is a vertical sectional view of the stopping off valve.
Figure 3:
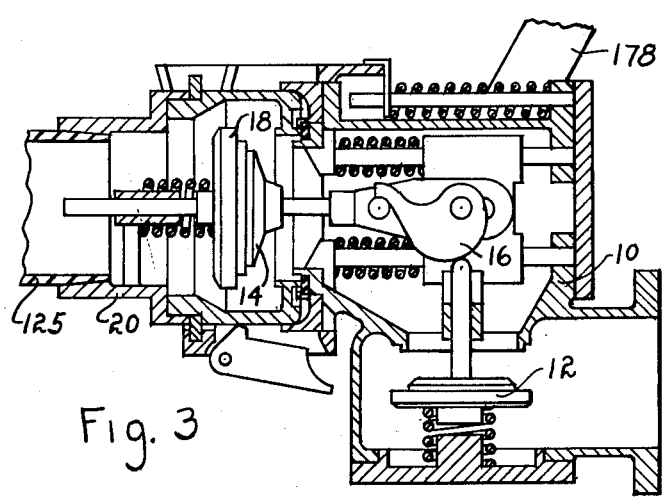
Figure 3 is a vertical sectional view of the manifold and hose valves and their operating mechanisms.

Figure 2 discloses a specific form of the valve 103—111 which is convenient and economical to build. The various parts are identified by the same numerals used in the schematic diagram of Figure 1.

It is obvious that various changes may be made in the form, structure and arrangement of parts without departing from the spirit of the invention. Accordingly, applicant does not desire to be limited to the specific embodiment disclosed herein primarily for purposes of illustration; but instead, he desires protection falling fairly within the scope of the appended claims.

What I claim to be new and desire to protect by Letters Patent of the United States is:

1. In an apparatus for filling a tank at a high rate of delivery comprising a liquid supply line under pressure, a delivery line communicating with said tank; a normally closed first valve connecting said lines and disposed entirely apart from the tank, a normally closed second valve in the delivery line, a motor for operating said first valve, means for balancing the pressure on opposite sides of the first valve when the second valve is closed including means connecting said motor with said delivery line, said motor comprising means responsive to a change in pressure in said delivery line effected by opening the second valve for opening the first valve.

2. In an apparatus for filling a tank at a high rate of delivery comprising a liquid supply line under pressure, a delivery line which includes a flexible hose and coupling communicating with said tank, a valve connecting said supply line with said hose and disposed entirely apart from the tank, a motor for operating said valve, means connecting said motor with said hose, said motor comprising means responsive to a change in pressure in said hose for opening the valve and means responsive to a predetermined level of liquid in the tank for closing said valve, said valve closing means including means disposed adjacent the motor, means disposed in the tank and separable means connecting the last two-mentioned means.

3. In an apparatus for filling a tank at a high rate of delivery comprising a liquid supply line under pressure, a delivery line which includes a flexible hose and coupling communicating with said tank, a valve connecting said supply line with said hose and disposed entirely apart from the tank, a motor for operating said valve, means connecting said motor with said hose, said motor comprising means responsive to a change in pressure in said hose for opening the valve, means responsive to a predetermined level of liquid in the tank to condition said motor for closing said valve, and additional means for closing the valve, said conditioning means including means disposed adjacent the motor, means in the tank and separable means connecting the last two-mentioned means.

4. In an apparatus for filling a tank at a high rate of delivery comprising a liquid supply line under pressure, a delivery line communicating with the tank, a normally closed first valve connecting said lines and disposed entirely apart from the tank, a manually operable second valve in said delivery line, a fluid motor comprising a pressure responsive member connected to operate the first valve, means for applying supply line pressure thereto in a direction to open the first valve and delivery line pressure in a direction to close it, yieldable means for urging the first valve closed and a restricted by-pass from said supply line through said member to said delivery line for balancing the pressures in the lines and on said member when the first valve is closed, said member serving to open said first valve when the delivery line pressure drops below that of the supply line.

5. In an apparatus for filling a tank at a high rate of delivery comprising a liquid supply line under pressure, a wet delivery line communicating with the tank, a first valve in the delivery line, a normally closed valve connecting said lines and disposed entirely apart from the tank, a fluid motor comprising a pressure responsive member connected to operate the normally closed valve, means for applying supply line pressure thereto in a direction to open the normally closed valve and delivery line pressure in a direction to close it, yieldable means for urging the normally closed valve closed and a restricted by-pass from said supply line through said member to said delivery line for balancing the pressure in the lines and on said member when the first and normally closed valves are closed, said member serving to open said normally closed valve when the delivery line pressure drops below that of the supply line.

6. In an apparatus for filling a tank at a high rate of delivery comprising a liquid supply line under pressure, a delivery line communicating with the tank, a valve in the delivery line, a normally closed valve connecting said lines and disposed entirely apart from the tank, a fluid motor comprising a pressure responsive member connected to operate the normally closed valve, means for applying supply line pressure thereto in a direction to open the normally closed valve and delivery line pressure in a direction to close it, yieldable means for urging the normally closed valve closed and a restricted by-pass from said supply line through said member to said delivery line for balancing the pressure in the lines and on said member when the valve in the delivery line and normally closed valve are closed, said member serving to open said normally closed valve when the delivery line pressure drops below that of the supply line and means responsive to the predetermined level of liquid in the tank for closing said by-pass between the member and the delivery line whereby the pressure on opposite sides of the member will be balanced and the normally closed valve closed by said yieldable means, said by-pass closing means including a means mounted in the by-pass, a level sensing means mounted in the tank and separable means connecting the last named means for operation when a predetermined level of liquid exists in the tank.

7. In an apparatus for filling a tank at a high rate of delivery comprising a liquid supply line under pressure, a delivery line communicating with the tank, a normally closed valve connecting said lines and disposed entirely apart from the tank, a fluid motor comprising a pressure responsive member connected to operate the valve, means for applying supply line pressure thereto in a direction to open the valve and delivery line pressure in a direction to close it, yieldable means for urging the valve closed and a restricted by-pass from said supply line through said member to said delivery line for balancing the pressure in the lines and on said member when the valve is closed, said member serving to open said valve when the delivery line pressure drops below that of the supply line and means responsive to the predetermined level of liquid in the tank for closing said by-pass between the member and the delivery line whereby the pressure on opposite sides of the member will be balanced and the valve closed by said yieldable means, said level responsive means comprising a normally open valve in said by-pass between the member and the delivery line, yieldable means for normally holding the normally open valve open and second pressure responsive means connected to said normally open valve in opposition to said yieldable means and connected to a sensing tube having an inlet disposed at a predetermined level above the bottom of said tank for operation by the hydrostatic pressure in the tube.

8. In an apparatus for filling a tank comprising a liquid supply system, means comprising a delivery line for connecting it to the tank, means in the delivery line for stopping delivery to the tank comprising a fluid motor, means for connecting one side thereof to the delivery line, a tube disposed in the tank and having an upper, open end disposed at a predetermined level in the tank, separable means connecting the other end of the tube to the other side of said motor, said connecting means being constructed and arranged to hold the liquid in said motor under pressure when the tube is disconnected, said motor being disposed at a lower level than the tank.

9. In an apparatus for filling a tank comprising a liquid supply system, means comprising a delivery line, means for connecting said delivery line to the tank, means for stopping delivery to the tank comprising a fluid motor, a tube disposed in the tank and having an upper, open end disposed at a predetermined level in the tank, means connecting the other end of the tube to said motor, said motor being disposed at a lower level than the tank and tube draining means for connecting said other end of the tube to said delivery line connecting means at a level below said tank and a check valve in said tube draining means opening toward said delivery line connecting line.

10. In an apparatus for filling a tank comprising a liquid supply system, means comprising a delivery line, means for connecting said delivery line to the tank, means for stopping delivery to the tank comprising a fluid motor, a tube disposed in the tank and having an upper, open end disposed at a predetermined level in the tank, means connecting the other end of the tube to said motor, said motor being disposed at a lower level than the tank and tube draining means for connecting said other end of the tube to said delivery line connecting means at a level below said tank and a gravity closed check valve in said tube draining means opening toward said delivery line connecting means.

11. In an apparatus for filling a tank, the combination of a supply line for liquid under pressure, a delivery line arranged for connection to the tank, a main valve and a stop valve connected in parallel between said lines, main and stop motors connected to said valves respectively, means for normally urging said valves closed, said motors including means responsive to the differential in the supply and delivery line pressures, means for applying supply and delivery line pressures to opposite sides of said responsive means, restricted ports connecting opposite sides of said responsive means, normally open main and stop control valves connected to the delivery line pressure applying means, liquid responsive operators therefor, main and stop tubes in said tank having open ends disposed at different predetermined levels in said tank and connected with said respective operator for said main and stop control means whereby the entry of liquid into the main tube will cause said main control valve to close thereby permitting said main valve to be closed under the control of its restricted port and whereby subsequent entry of liquid in the stop tube will cause the stop control valve to close thereby permitting the stop valve to close under control of its restricted port.

12. In an apparatus for filling a tank, the combination of a supply line for liquid under pressure, a delivery line arranged for connection to the tank, a main valve and a stop valve connected in parallel between said lines, main and stop motors connected to said valves respectively, means for normally urging said valves closed, said motors including means responsive to the differential in the supply and delivery line pressures, means for applying supply and delivery line pressures to opposite sides of said responsive means, restricted ports connecting opposite sides of said responsive means, normally open main and stop control valves connected to the delivery line pressure applying means, liquid responsive operators therefor, main and stop tubes in said tank having open ends disposed at different predetermined levels in said tank and connected with said respective operator for said main and stop control means whereby the entry of liquid into the main tube will cause said main control valve to close thereby permitting said main valve to be closed under the control of its restricted port and whereby subsequent entry of liquid in the stop tube will cause the stop control valve to close thereby permitting the stop valve to close under control of its restricted port and means for draining said tubes during delivery from said tank.

13. In an apparatus for filling a tank, the combination of a supply line for liquid under pressure, a delivery line arranged for connection to the tank, a main valve and a stop valve connected in parallel between said lines, main and stop motors connected to said valves respectively, means for normally urging said valves closed, said motors including means responsive to the differential in the supply and delivery line pressures, means for applying supply and delivery line pressures to opposite sides of said responsive means, restricted ports connecting opposite sides of said responsive means, normally open main and stop control valves connected to the delivery line pressure applying means, liquid responsive operators therefor, main and stop tubes in said tank having open ends disposed at different predetermined levels in said tank and connected with said respective operator for said main and stop control means whereby the entry of liquid into the main tube will cause said main control valve to close thereby permitting said main valve to be closed under the control of its restricted port and whereby subsequent entry of liquid in the stop tube will cause the stop control valve to close thereby permitting the stop valve to close under control of its restricted port and means for draining said tubes during delivery from said tank comprising a main conduit connected to said main tube and a stop conduit connected to said stop tube, means connecting both conduits with said delivery line, a normally closed valve in each conduit opening toward said delivery line and means responsive to differential in pressures in said tubes and said line for opening said valves.

14. In an apparatus for filling a mobile tank, the combination of a ground installation comprising a supply line for liquid under pressure, a flexible delivery line, a control valve for controlling the flow from the supply to the delivery line, a manually operable valve at the end of the delivery line, a motor connected to operate the control valve, control means forming a part of the ground installation operable between two positions, said control means when in a first position serving to condition said motor for opening the control valve and in a second position serving to condition the motor for closing the control valve, a tank installation comprising a tank, a fill line communicating with the tank, means for connecting said fill and delivery lines, a liquid level sensing device in the tank and means connecting said sensing means to said control means for operating said control means to its second condition when the liquid level in the tank attains a predetermined level.

15. In an apparatus for filling a mobile tank, the combination of a ground installation comprising a supply line for liquid under pressure, a flexible delivery line, a control valve for controlling the flow from the supply to the delivery line, means for continuously urging said control valve closed, a manually operable valve at the end of the delivery line, a motor connected to open the control valve, control means forming a part of the ground installation operable between two positions, said control means when in a first position serving to condition said motor for opening the control valve and in a second position serving to condition the motor for closing the control valve, a tank installation comprising a tank, a fill line communicating with the tank, means for connecting said fill and delivery lines, a liquid level sensing device in the tank and means connecting said sensing means to said control means for operating said control means to its second condition when the liquid level in the tank attains a predetermined level.

16. In an apparatus for filling a mobile tank, the combination of a ground installation comprising a supply line for liquid under pressure, a flexible delivery line, a control valve for controlling the flow from the supply to the delivery line, a manually operable valve at the end of the delivery line, a motor connected to operate the control valve, control means forming a part of the ground installation operable between two positions, said control means when in a first position serving to condition said motor for opening the control valve and in a second position serving to condition the motor for closing the control valve, a tank installation comprising a tank, a fill line communicating with the tank, means for connecting said fill and delivery lines, a liquid level sensing device in the tank, means connecting said sensing means to said control means for operating said control means to its second condition when the liquid level in the tank attains a predetermined level, and means for conditioning said sensing means by the draining of the tank for restoring said control means to its first position.

17. In an apparatus for filling a mobile tank, the combination of a ground installation comprising a supply line for liquid under pressure, a flexible delivery line, a control valve for controlling the flow from the supply to the delivery line, a manual valve at the end of the delivery line, a pressure responsive member connected to operate the control valve, a first conduit connecting the supply line with said member to urge it in a valve opening direction, a second conduit connecting said delivery line with said member to urge it in a valve closing direction, a motor operated valve connected to open and close said second conduit, a restricted by-pass for said pressure responsive member, a tank installation including a tank, a fill line connected to the tank, means for connecting said fill and delivery lines, a liquid level sensing means in the tank and means for connecting said sensing means with said motor, said sensing means and motor being constructed and arranged to close the motor operated valve when the liquid attains a predetermined level in the tank.

18. In an apparatus for filling a mobile tank, the combination of a ground installation comprising a supply line for liquid under pressure, a flexible delivery line, a control valve for controlling the flow from the supply to the delivery line, a manual valve at the end of the delivery line, a pressure responsive member connected to operate the control valve, a first conduit connecting the supply line with said member to urge it in a valve opening direction, a second conduit connecting said delivery line with said member to urge it in a valve closing direction, a liquid pressure responsive motor, a pilot valve disposed to open and close said second conduit and connected for operation by said motor, a restricted by-pass for said pressure responsive member, a tank installation including a tank, a fill line connected to the tank, means for connecting said fill and delivery lines, a liquid level sensing means comprising a tube having an upper, open end disposed at a predetermined level in said tank, and separable means for transmitting the pressure of liquid in the tube to said pressure responsive motor to close said pilot valve.

19. In an apparatus for filling a mobile tank, the combination of a ground installation comprising a supply line for liquid under pressure, a flexible delivery line, a control valve for controlling the flow from the supply to the delivery line, a manual valve at the end of the delivery line, a pressure responsive member connected to operate the control valve, a first conduit connecting the supply line with said member to urge it in a valve opening direction, a second conduit connecting said delivery line with said member to urge it in a valve closing direction, a liquid pressure responsive motor, a pilot valve disposed to open and close said second conduit and connected for operation by said motor, a restricted by-pass for said pressure responsive member, a tank installation including a tank, a fill line connected to the tank, means for connecting said fill and delivery lines, a liquid level sensing means comprising a tube having an upper, open end disposed at a predetermined level in said tank, separable means for transmitting the pressure of liquid in the tube to said pressure responsive motor to close said pilot valve and means for connecting said tube in communication with said fill line for draining said tube as said tank is drained.

20. In an apparatus for filling a mobile tank, the combination of a ground installation comprising a supply line for liquid under pressure, a flexible delivery line, a control valve for controlling the flow from the supply to the delivery line, a manual valve at the end of the delivery line, a pressure responsive member connected to operate the control valve, a first conduit connecting the supply line with said member to urge it in a valve opening direction, a second conduit connecting said delivery line with said member to urge it in a valve closing direction, a liquid pressure responsive motor, a pilot valve disposed to open and close said second conduit and connected for operation by said motor, a restricted by-pass for said pressure responsive member, a tank installation including a tank, a fill line connected to the tank, means for connecting said fill and delivery lines, a liquid level sensing means comprising a tube having an upper, open end disposed at a predetermined level in said tank, separable means for transmitting the pressure of liquid in the tube to said pressure responsive motor to close said pilot valve and means for connecting said tube in communication with said fill line for draining said tube as said tank is drained including a check valve in said line arranged to prevent flow toward said tube.

References Cited in the file of this patent

UNITED STATES PATENTS

| Number | Name | Date |
|---|---|---|
| 254,944 | Evans | Mar. 14, 1882 |
| 659,311 | Maschmeyer | Oct. 9, 1900 |
| 931,228 | Schutte | Aug. 17, 1909 |
| 1,176,535 | Fulton | Mar. 21, 1916 |
| 1,302,538 | Gulick | May 6, 1919 |
| 1,627,628 | Anderson | May 10, 1927 |
| 2,235,304 | Toussaint | Mar. 18, 1941 |
| 2,328,323 | Bowers | Aug. 31, 1943 |
| 2,384,628 | Krone | Sept. 11, 1945 |
| 2,443,679 | Glantzer | June 22, 1948 |
| 2,505,093 | Brock | Apr. 25, 1950 |
| 2,548,368 | Hartley | Apr. 10, 1951 |